(12) United States Patent
Duranti et al.

(10) Patent No.: US 7,761,199 B2
(45) Date of Patent: Jul. 20, 2010

(54) TERMINATION MAP FOR AN AIRCRAFT

(75) Inventors: Simone Duranti, Linköping (SE); Erik Petrini, Spånga (SE)

(73) Assignee: SAAB AB, Linköping (SE)

( * ) Notice: Subject to any disclaimer, the term of this patent is extended or adjusted under 35 U.S.C. 154(b) by 644 days.

(21) Appl. No.: 11/785,670

(22) Filed: Apr. 19, 2007

(65) Prior Publication Data

US 2008/0167762 A1   Jul. 10, 2008

(30) Foreign Application Priority Data

Apr. 20, 2006   (EP) .................................. 06112821

(51) Int. Cl.
    *G01C 22/00* (2006.01)
(52) U.S. Cl. .................................................... 701/25
(58) Field of Classification Search .................. 701/3, 701/11, 25, 120, 200, 202, 212, 213; 340/130, 340/961, 969, 970, 971, 974, 973, 976
    See application file for complete search history.

(56) References Cited

U.S. PATENT DOCUMENTS

| 4,538,229 A | 8/1985 | Baltzer et al. |
| 6,182,007 B1 | 1/2001 | Szczerba |
| 6,377,875 B1 | 4/2002 | Schwaerzler |
| 2004/0039498 A1 | 2/2004 | Ollis et al. |
| 2004/0193334 A1 | 9/2004 | Carlsson et al. |

FOREIGN PATENT DOCUMENTS

| DE | 19849857 A1 | 5/2000 |
| EP | 1462898 A2 | 9/2004 |
| JP | 2005017027 A | 1/2005 |

OTHER PUBLICATIONS

European Search Report—Nov. 22, 2006.
RTCA, Inc.; Software Considerations in Airborne Systems and Equipment Certification; 1992.

*Primary Examiner*—Kim T Nguyen
(74) *Attorney, Agent, or Firm*—Venable LLP; Eric J. Franklin

(57) ABSTRACT

A method of creating a termination map for an aircraft over an area of interest indicating the lowest allowable flight altitude to achieve a glide path of a vehicle to a termination point of the area of interest and a map of vectors of the area of interest indicating direction towards a termination point to control an unmanned vehicle.

6 Claims, 5 Drawing Sheets

TERMINATION MAP FOR AN AIRCRAFT

CROSS-REFERENCE TO RELATED APPLICATIONS

This application claims priority to European patent application number 06112821.1 filed 20 Apr. 2006.

FIELD OF THE INVENTION

The invention relates to the field of aircraft navigation, in particular to a so called termination map for use when terminating a flight in case of unforeseen events. It also relates to a method of forming such a map, and an aircraft provided with a system using such a map.

BACKGROUND OF THE INVENTION

Unmanned aerial vehicles, UAVs, either remotely piloted (RPVs) or semi- or fully autonomous, represent an increasingly important field of aircraft technology. When flying autonomous aerial vehicles it is of utter importance to secure in the route planning that the aerial vehicle will be able to reach an approved termination point. When a failure occurs in the UAV, such as engine failure or the like, the unmanned vehicle must terminate the flight at an approved termination point with an acceptable terrain or the like. Above all, it is necessary to fully exclude the risk of terminating or crashing the UAV in populated areas. This can be achieved by using termination points, wherein these points are predetermined as acceptable points. It is also important as stated above that the UAV is able to reach its termination point and that this is secured.

In EP 1 462 898 A2 is disclosed, how it is ensured that each leg of the flight route has a termination point that is reachable for the UAV, and how it is ensured that the UAV is able to reach that termination point. However, the process is carried out to a large extent manually.

However, in future applications it will probably become very complex and resource demanding to predetermine by hand termination points for each special assignment. In addition, access to acceptable termination points can regulate on how the break point routes, flight paths, should be set up as well as where one can fly. Especially, one wants to use route planners that automatically configure new routes.

To solve this problem predetermined and prestudied termination maps may be used. These maps should describe a flight path or route to home as well as give information concerning the lowest acceptable flight altitude in order to complete the termination of the UAV from an arbitrary point of the map. The generation of the map is based on the application "Emergency flight plan".

Document US-A1-20040039498 discloses a method of constructing a density map which represents the terrain and wherein each cell of the map contains a density vector representing the density of portion of the terrain and is useful to determine the traversability of the terrain to mobile vehicles. Document U.S. Pat. No. 6,182,007 discloses a route planning algorithm for a vehicle that takes into account the aspect angle which the vehicle presents to threats in the environment. A route is determined through the environment by summing the map cost values of each grid cell though which the vehicle may travel. The terrain of the area is taken into account. Document US-A1-20040193334 discloses a method where a UAV after a failure determines to glide to a termination point that has been predefined prior to the mission. U.S. Pat. No. 4,538,229 discloses a method for examining single engine performance capabilities and developing alternate routes/paths for two engine aircrafts such that an attendant loss of altitude will not result in the aircraft dropping below a net flight path altitude and clearance distance with respect to the earth's surface along a given route between an originating point and a destination point. The object of the method is to maintain a safe elevation relative to the terrain during a failure in order to reach a predetermined destination for a full sized aircraft. However, these documents all disclose mission dependent complex methods that are not easily implemented in an UAV.

The general object of the invention is to provide a method that easily and very accurate determines alternate termination points that are reachable for an unmanned vehicle. The method should be easy to verify to achieve level A of the provisions laid down in RTCA-DO-178B. Even if a loss of performance occurs due to the indirect route to the termination point the loss is relatively small and does not incur a noticeable increase in lowest allowable flight altitude.

SUMMARY OF THE INVENTION

The present invention relates to a termination map, methods for producing the same, a vehicle and method of using said map.

The present invention relates to a method to automatically, in advance, planning a multitude of contingency routes for an aircraft, each route leading from an arbitrary position to a predefined termination point. When a failure occurs in the vehicle resulting in that the vehicle cannot complete its predetermined route in an area of interest including; the following steps may be taken a) receiving an indication that failure has occurred; b) positioning the vehicle; c) determining control parameters, d) controlling the vehicle to move in accordance to the determined control parameters; the control parameter are a direction read from a map of vectors pointing in a direction following a path towards the defined termination point corresponding to the position of the vehicle.

The invention furthermore relates to an unmanned vehicle that comprises a control system that automatically, during normal flight, keep a lowest acceptable flight level according to a lowest flight level map, and, during emergency, directs the unmanned vehicle to a predefined termination point. The control system comprises: a monitoring unit that receives indications when failure occurs; a position determination unit that determines the current position, a central processing unit that determines control parameters; and a flight control system that comprises: a main mission control sub system adapted to control the movement of the unmanned vehicle according to a predefined route, and main mission requirements, during regular flight, and according to an altitude read from a topographical map indicating lowest allowable flight altitude to achieve glide path to the termination point; and an emergency control sub system adapted to control the movement of the unmanned vehicle according to the control parameters received from the central processing unit; the control parameter being: a direction read from a map of vectors pointing in a direction forming a path towards the termination point based on the current position received from the position determination unit when a failure is indicated by the functional monitoring system.

The invention additionally relates to a method of creating a topographical map of an area of interest indicating the lowest allowable flight altitude to achieve glide path of a vehicle to a termination point of the area of interest. Further, it relates to a method of creating a map of vectors of the area of interest indicating a suitable flight direction towards a termination point.

The invention further discloses maps created according to the method mentioned above. The invention also relates to a computer program product that when executed on a computer executes a method of creating a supportive geographical data base representing an area of interest useable for controlling an unmanned aeronautical vehicle and indicating, for every geographical position in the data base, a lowest allowable flight altitude and a course to steer to reach a predefined allowable termination point by gliding.

By setting up the method in before hand, the risk of providing an insufficient set of termination points is reduced.

BRIEF DESCRIPTION OF THE DRAWINGS

The invention will be described in more detail below with reference to examples of embodiments and with reference to the attached drawing, on which FIG. 1 discloses schematically an area of interest divided in a grid.

DETAILED DESCRIPTION OF EMBODIMENTS OF THE INVENTION

For the purpose of the present application the following words should be interpreted with their indicated meanings.

DEFINITIONS cell—the area of a map can be divided into smaller units called cells. Cells are often of a square shape but can be of any shape, as long as the complete area is covered.

emergency control subsystem—a system for a vehicle responsible for, during emergency conditions, piloting of the vehicle.

"lowest allowable flight height", designated "$FA_{MIN}$"—the lowest allowable flight height in order to glide to an approved and preferred predetermined termination point.

main mission control sub system—a system for a vehicle responsible for, during regular conditions, mission control including piloting of the vehicle as opposed to "emergency control subsystem"

main mission requirements—parameters defining the purpose and objects of a mission, can be e.g. to follow a flight route, or follow a target with the aid of sensors.

map—a reduced, schematic representation of a geographical area. Also used to denote an electronic representation of a geographical area or of parameters corresponding to geographical positions.

positioning—the act of determining a position of an object e.g. determining a longitude and a latitude of the object.

positioning unit—a unit able to provide a position for a vehicle. Said unit may use e.g. global positioning system (GPS) or inertial navigation techniques.

termination point—a position where it is deemed acceptable to land or crash an aerial vehicle.

topography—the configuration of a surface and the relations among its man-made and natural features and a precise detailed study of the surface features of a region topographical profile—the general surface features of the earth, such as grassland, forest, marsh, agricultural, urban, and barren rock. Used in order to establish ground level of a cell of a map.

topographic map—is a map that represents elevations of the ground on it. Elevation on topographic maps can be indicated in various ways. The most commonly used method is to plot contour lines joining points of equal height or depth. The difference in elevation between contour lines is known as the contour interval.

Figure 1:
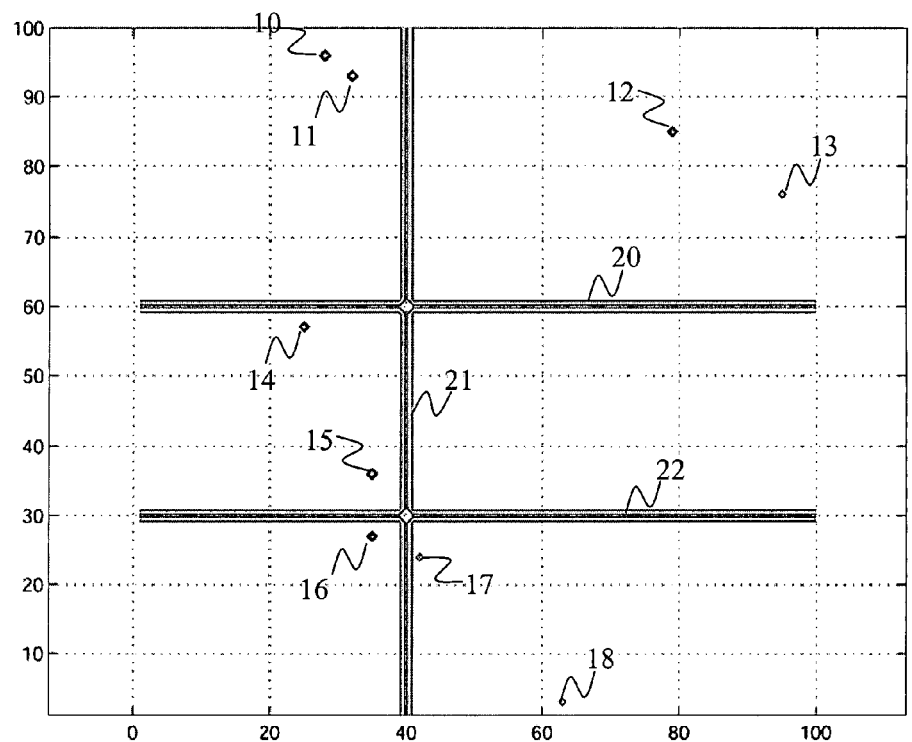

The invention relates among other things to a map for route planning for an aerial vehicle. The map comprises a representation of data of the environment and includes an array of cells or elements that defines a coordinate system. One or more approved termination points are marked in the map. Further, in each cell a minimum flight altitude is determined for the coordinate related to that cell, based on certain parameters, see below. The minimum flight heights are generated in relation to the distance to the approved termination points such that the aerial vehicle will be able to reach the preferred approved termination points from each cell in a gliding mode. With the word "preferred" in the term "preferred approved termination point" is implied as a rule that the cell corresponding to the current position of the UAV only designates one termination point, i.e. the preferred one. Exception from this rule is explained below. Referring to FIG. 1, a number of approved termination points 10-18 have been selected and placed around in a grid of an area of interest. Ridges 20-22 are represented as solid lines. Other elements that affect the map may be mountains, buildings, populated areas and the like. Permanent no-flight-zones are represented as ground with appropriate height, e.g. ground is set to be very high if the zone does not allow a vehicle to fly there. The approved termination points 10-18 are determined, selected and set by an operator. The operator may base the decision of suitable termination points on the terrain, the nearness to populated places or the like. Approved termination points are distributed over an area in order to provide at least one approved termination point to an UAV independent of the position where the UAV decides to navigate according to emergency control subsystem. It follows from the above that the UAV in this way always has a reachable approved termination point to glide to.

Figure 2:
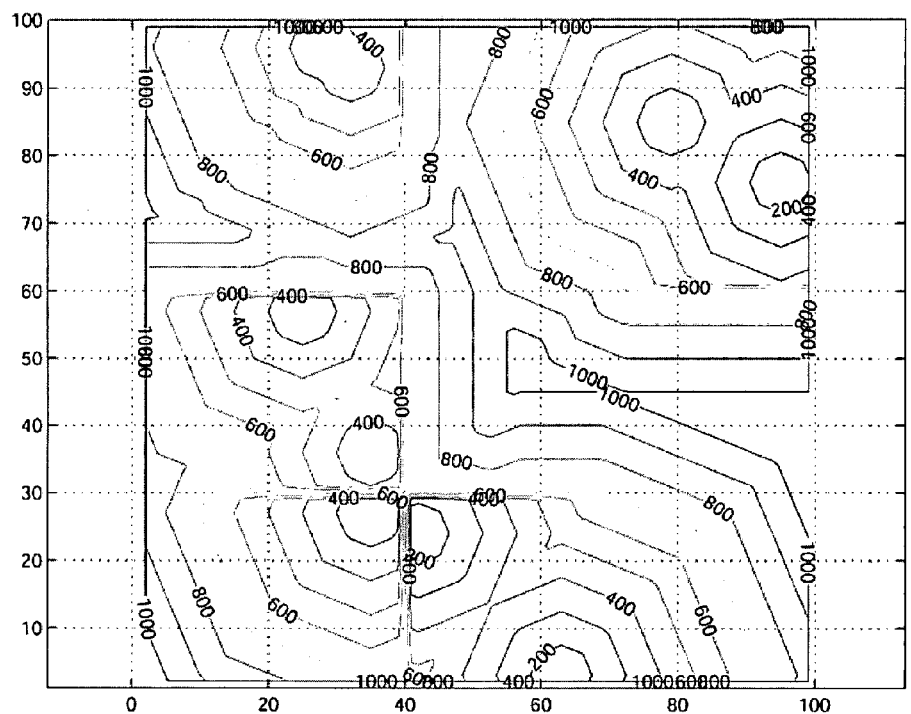
FIG. 2 illustrates schematically a topographical map of $FA_{MIN}$ according to an embodiment of the invention.

Now referring to FIG. 2, the approved termination points indicated in FIG. 1 are entered into an algorithm according to an embodiment of the invention. From the algorithm a lowest flight altitude to achieve a glide path to an approved termination point of each point of the map are received and a map according to FIG. 2 can be established. In the illustrated embodiment the lowest flight altitude to achieve glide path to an approved termination point are indicated as numbers all over the map forming so called topographical lines representing lowest altitude to achieve glide path to a termination point. In the illustrated embodiment in FIG. 2, lines are e.g. marked with 1000 m and 800 m.

Figure 3:
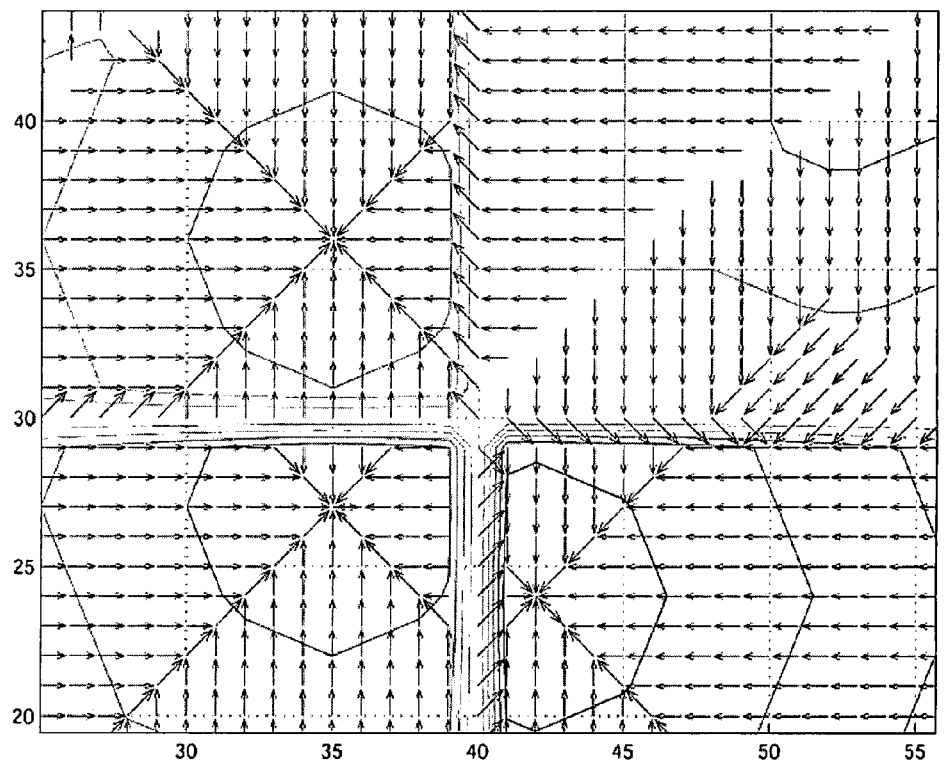
FIG. 3 illustrates an enlarged section of a map of vectors according to an embodiment of the invention.

Now referring to FIG. 3, a termination path vector field is illustrated constituting a vector map in which the direction of the flight to an approved termination point is described for every cell of the grid. Due to the fact that the direction of flight to the approved termination point is influences by the shape of the cells of the map, the way of flight may not be the shortest. However, by comparing the way of flight calculated by the algorithm and the closest route to the termination point, it can be shown that the loss of route is marginal.

Figure 4:
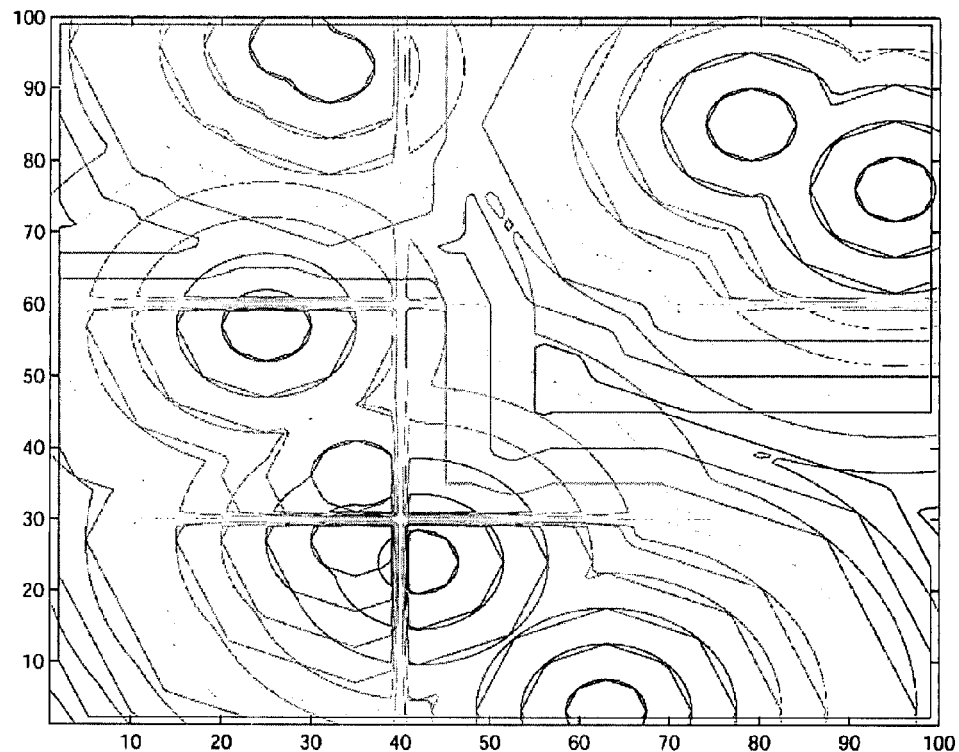
FIG. 4 shows a comparison between the algorithm solution and closest route solution, for the case a square grid is used to divide the map.

FIG. 4 shows that the loss of route is marginal to the closest route. The closest route is shown as circular rings 410 as compared to polygonal lines 420 according to an embodiment of the invention. The route to the termination point when using the closest route extends linearly in towards the termination point forming a straight route to the termination point wherever the vehicle is positioned at the circular ring while when using the present invention the route extends in a straight line towards the termination point only when the vehicle is positioned at a corner of the polygonal line, as also can be seen in FIG. 3. It should be noted that the closest route does not take the terrain of the area into the account but yet only the distance to the approved termination points.

For an area of interest wherein one or a plurality of missions are about to be performed by an unmanned aeronautic vehicle a plurality of termination points are predetermined in a grid of the area of interest. The grid pattern may be a two dimensional squared mesh but the mesh may be in any suitable form e.g. hexagonal or fully unstructured. In the above mentioned grid, map data, representing topography of the area of interest, are used in order to create and define a topographical profile of the map. Furthermore, the termination points are marked up in the map, the termination points may be selected by hand or computerized selected. The data of the map, representing topographical profile of each cell, are then entered into the algorithm of the present invention and are processed accordingly in order to achieve a grid with lowest allowable flight altitude and approved termination paths. For each cell of an approved termination point the lowest allowable flight altitude is set to the ground level and the direction vector is set to a zero vector.

From every approved termination point the algorithm processes the cells surrounding the cell representing the approved termination point and processes data of cells adjacent to the previously processed cell. In case allowable flight altitude in adjacent cell can be reduced when gliding to the point one started out from during the process a new lowest flight altitude is set up and a vector pointing to the start point is set up as well. This process proceeds until the edges of the grid is reached or all adjacent points already have an optimal solution, e.g. from a different termination point. The lowest allowable flight altitude of each point can not be less than the topographical height of the point; this height with an optional added margin can then be adjusted to an optimal height, e.g. considering mountain ridges or the like.

The result of the algorithm is a topographical map that can directly be employed in a route planner to compute routes that are approved relatively to the approved termination point. Furthermore, a map of vectors is provided that is used to direct the vehicle when termination process is initiated.

Figure 5:
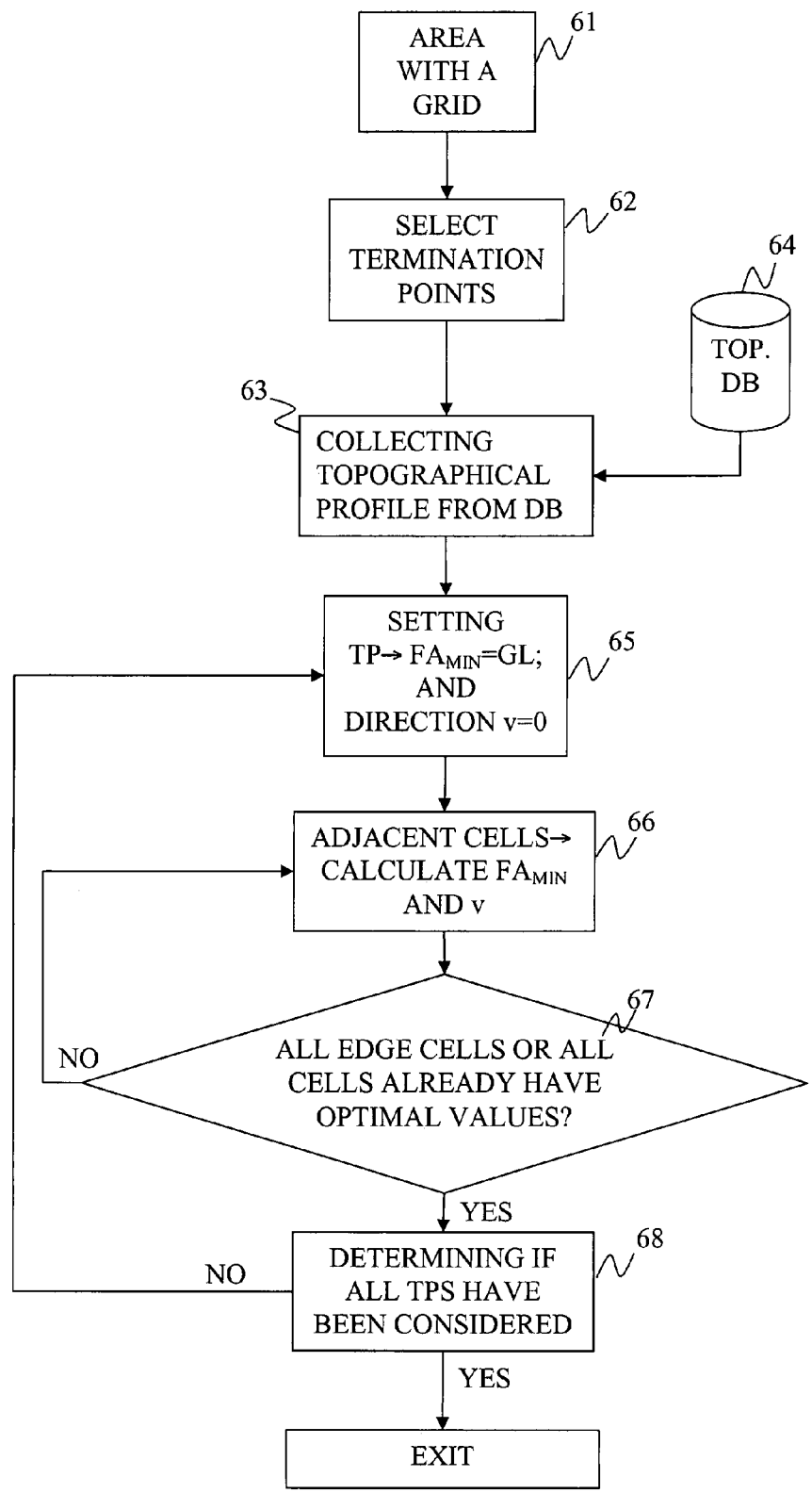
FIG. 5 is a flow diagram of a method of making the topographical map and map of vectors according to an embodiment of the invention.

In order to further explain the forming of the map the description of the forming will be explained referring to FIG. 5. In step 61 an area of interest will be divided by a grid in order to form cells of the area. This is preferably done in advance. In step 62 of the illustrated embodiment the operator selects termination points based on selected preferences, it should however be noted that this selection step can be made computerized basing the selection on a number of parameters fetched from the map or other databases. In step 63 each cell receives a topographical profile of the terrain of the cell; this information is collected/received from, e.g. a topographical map database 64 or the like. In step 65, the lowest allowable flight altitude, $FA_{MIN}$, is set to ground level, GL, for each of the selected approved termination points, TP. The directional vector of the cell corresponding to the approved termination points TP is set to zero. According to step 66 each cell adjacent to the termination point TP is processed and examined in order to compute a lowest allowable flight altitude $FA_{MIN}$ for each cell as well as a directional vector pointing towards the termination point TP. The computed $FA_{MIN}$ is compared with data of height collected from the topographical profile of the cell. If the computed $FA_{MIN}$ is less than the height data collected from the topographical profile, the $FA_{MIN}$ is set to the height data collected from the topographical profile. If, however, the computed $FA_{MIN}$ is higher than the height data collected from the topographical profile, the $FA_{MIN}$ is set to the computed $FA_{MIN}$. Step 66 is repeated for all the cells of the grid of the area of interest in order to set a $FA_{MIN}$ and a vector for all cells. The $FA_{MIN}$ is calculated to allow the UAV to glide to the previously calculated $FA_{MIN}$ of the previously processed cell to which the vector is pointing to. In the illustrated embodiment of FIG. 5 step 66 is repeated until edge of the grid is reached or all the adjacent cells already have a computed optimal $FA_{MIN}$ which may be related to a different approved termination point TP that is lower than the computed $FA_{MIN}$ relating to the presently considered termination point, as shown in step 67. As indicated in step 68, the procedure is repeated for all the remaining terminal points. During a computation from a termination point a cell that has been previously processed from a different termination point already has a computed value of $FA_{MIN}$ then the $FA_{MIN}$ value that has the lowest value is selected and the direction vector assigned to the selected $FA_{MIN}$ is determined as the direction vector of that cell. When all the termination points TPs have been processed the map is finished, resulting in a topographical map stating $FA_{MIN}$ for all the cells as well as in a map of vectors pointing towards optimal termination points. The topographical map may be used in a route planner or a pilot guide in the case where the vehicle is remotely controlled for computing routes that are approved based on the termination point. The map of vectors is used in order to direct the vehicle to a termination point when an emergency occurs or the like that requires a termination of the vehicle.

Figure 6:
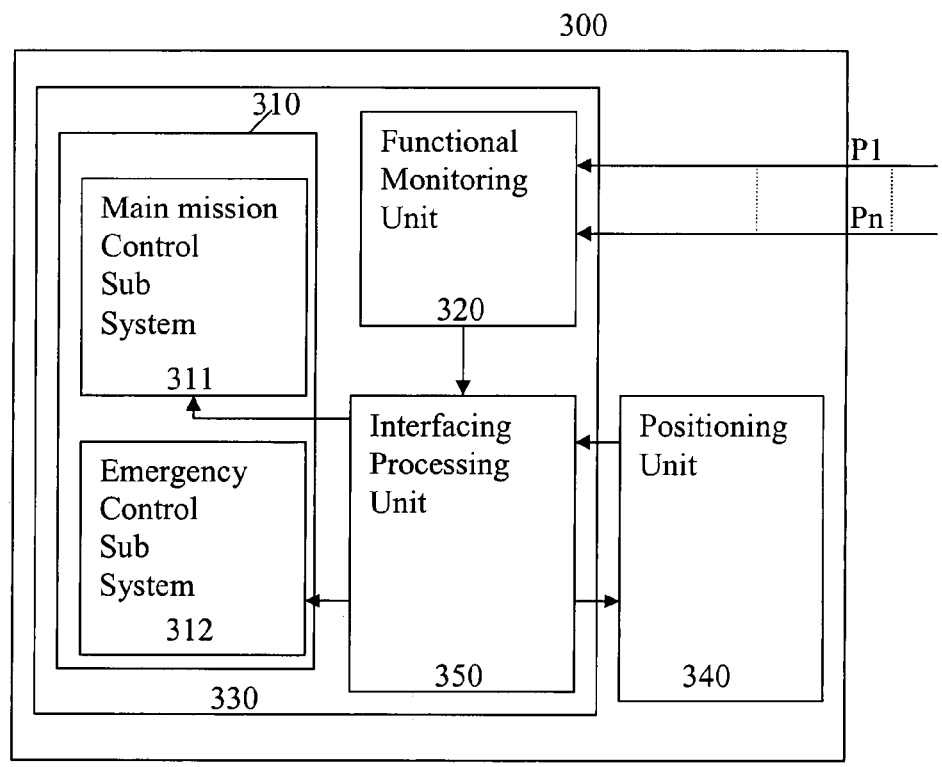
FIG. 6 discloses a block diagram of a signalling control system of an embodiment of the invention.

Referring to FIG. 6, the unmanned vehicle comprises a signalling control system 300 according to an embodiment of the present invention which includes a central processing unit CPU 330 and a positioning unit 340. An on board flight control system 310, a functional monitoring system 320 and an interfacing processing unit 350 are included in the central processing unit CPU 330. The on board flight control system 310 contains a main mission control sub system 311 and an emergency control sub system 312. The main mission control sub system 311 is adapted to control the vehicle to move according to main mission requirements and data received from the interfacing processing unit 350. The emergency control sub system 312 is adapted to control the vehicle to move according to data collected in the interfacing processing unit from a topographical map of lowest allowable flight altitude and a map of vectors created as stated above. The on board flight control system may further include an additional control sub system (not shown) that is adapted to control the vehicle to move according to commands received in real time from an operator through an optional wireless interface unit (not shown). The functional monitoring system 320 is adapted to monitor a set of flight control parameters P1-Pn. In case any of these parameters P1-Pn falls outside an acceptable range, the functional monitoring system 320 sets a relevant alarm condition, e.g. engine failure. Through positioning unit 340 the position of the vehicle is received or calculated, through such as Global positioning system, GPS, inertial navigation system, INS or the like. The interfacing processing unit 350 uses this positioning information from the positioning unit 340 and the fact that engine failure has occurred in order to produce an emergency route for the vehicle to adapt. The interfacing processing unit 350 has access to maps in accordance to the once described above, either through a separated memory (not shown) or integrated in the interfacing processing unit 350. From the positioning information the interfacing processing unit receives a cell identification and from this cell information of the lowest allowable flight altitude $FA_{MIN}$ can be read as well as what direction the vehicle should take in order to crash/land in a predetermined termination point, all according to the topographical map of lowest allowable flight altitude and the map of vectors computed in before hand. This information is then transferred to the secondary control sub system that guides the vehicle in accordance to said information. It should be understood that different emergency conditions may require different computed topographical maps and therefore, the control system of a vehicle may comprise a plurality of topographical maps based on conditions reported from the functional monitoring system 320.

It should also be noted that the map containing $FA_{MIN}$ received from the memory is also used during a flight when no emergency has occurred in order to always be at a flight altitude that is adjusted to height if an emergency should occur, i.e. the data from the $FA_{MIN}$ map is also used in the main mission control sub system 311 during flight when no emergency has occurred.

Figure 7:
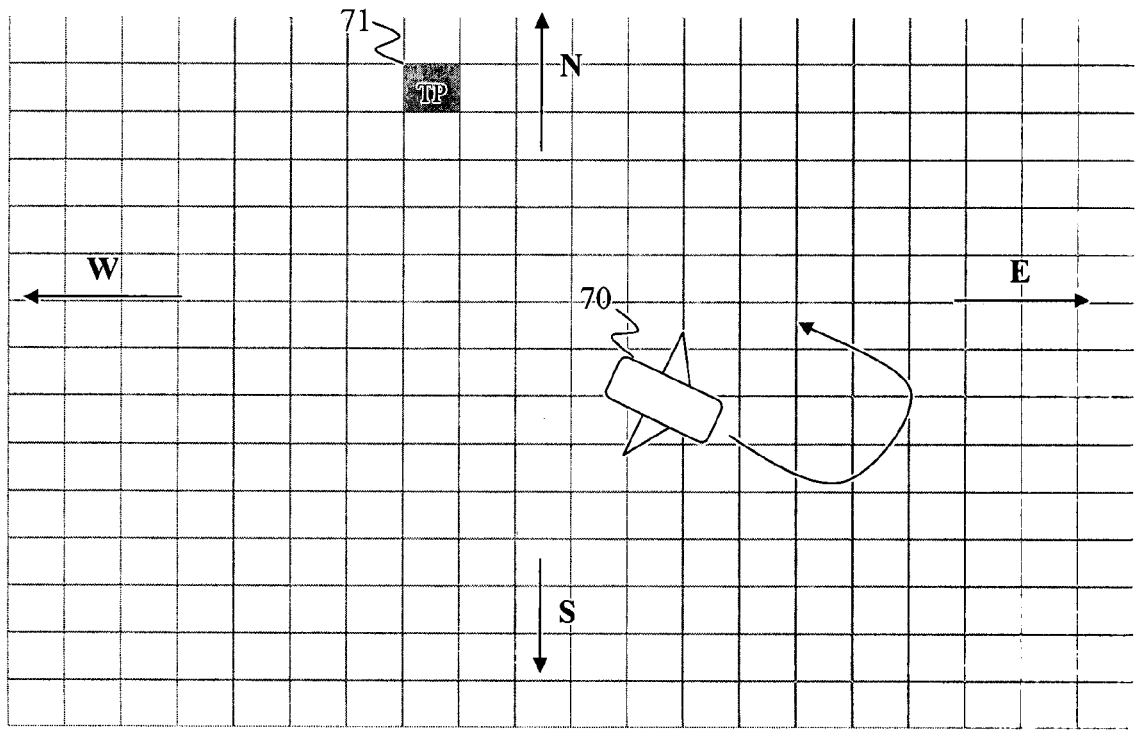
FIG. 7 illustrates how current flight course can induce height loss if preferred termination point is behind UAV.

FIG. 7 shows an unmanned vehicle 70 travelling in a south east direction. When an emergency occurs the unmanned vehicle 70 determines the termination path, in the illustrated example North West direction, to a predetermined termination point TP 71 in accordance to what is stated above. However, in the illustrated example a problem that arises is that the unmanned vehicle has to make a U-turn in order to get on the termination path and thereby looses altitude. This may be solved differently. In an embodiment of the present invention this problem is solved by adding a marginal to the calculated $FA_{MIN}$ adjusted to taking into account the altitude loss due to a U-turn. It should here also be noted that either the U-turn may guide the unmanned vehicle to the cell where the emergency occurred or to a different cell generating an alternate direction towards the termination point TP.

Figure 8:
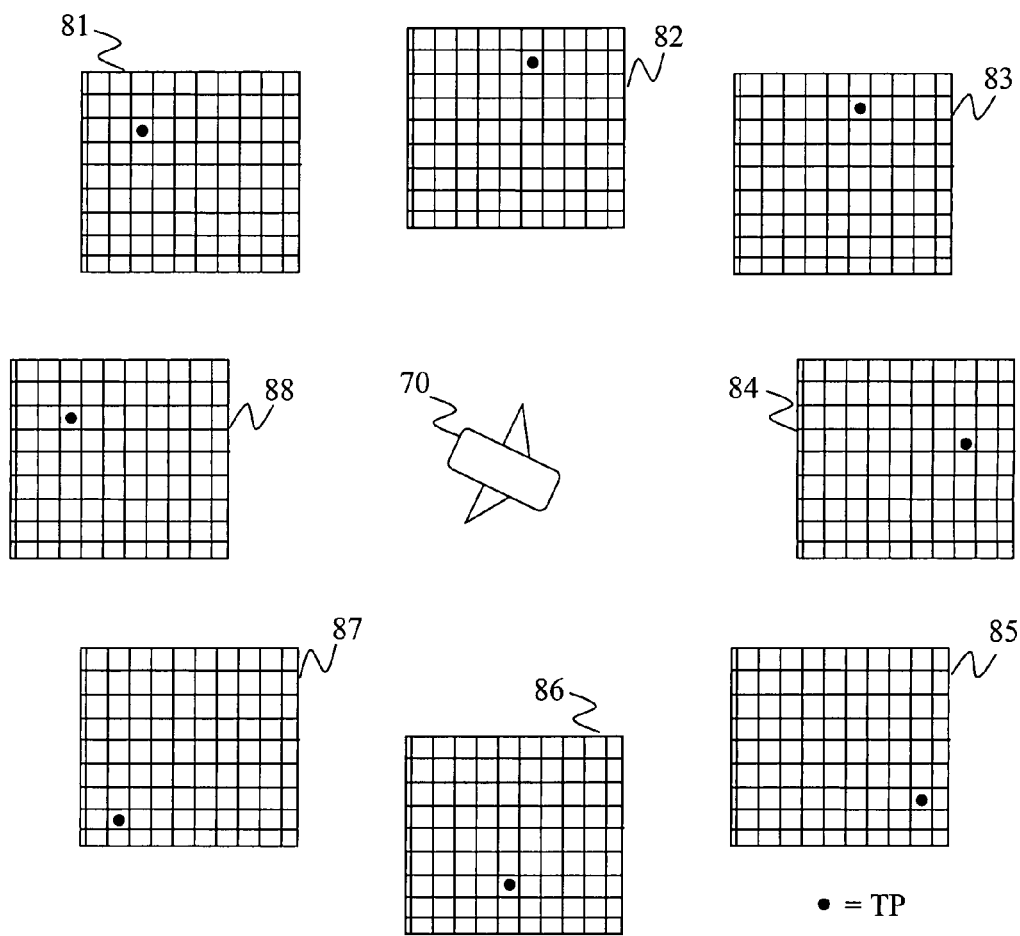
FIG. 8 shows eight different termination maps to be used dependable on the current flight course of the UAV.

In a different embodiment the memory of the unmanned vehicle contains a plurality of maps of vectors and $FA_{MIN}$. Each map is prepared having a certain travelling direction in mind. In FIG. 8 a set of 8 maps is illustrated. Here, as an example, the unmanned vehicle is travelling in a South East direction. In a memory of the unmanned vehicle the eight maps of vectors and $FA_{MIN}$ 81-88 are stored; all relating to the direction the unmanned vehicle 70 is travelling. A first map 81 is selected when the vehicle is travelling in a NW-direction; a second map 82 is selected if the vehicle is travelling in a North direction and so on. In the illustrated case wherein the vehicle 71 is travelling in a South East direction a fifth map 85 is selected. As illustrated, different travelling directions may result in different termination points TP due to the altitude loss of making a turn. It should be understood that the number of maps due to directions may vary between embodiments.

The act of selecting a map due to a direction may be based on intervals such as 45° in the illustrated example, 360/8=45. As shown in the illustrated example certain directions such as NW and W cause the same map to be selected. In order to save memory capacity an indication that the same map is used for both the directions can be implemented and used in the CPU of the vehicle.

It should be understood that the lowest allowable flight altitude is computed based on the glide path of the aircraft to the approved termination point and with safety margins added to allow for unfavourable atmosphere conditions.

In a further preferred embodiment a data structure is provided useable as a precaution plan and as an emergency flight plan onboard an aircraft were said data structure comprises a number of records, each record corresponding to a limited geographical area, and the records together covering an area of interest for an aircraft having a mission, each record capable of holding data representative of a recommended lowest allowable flight altitude for non-emergency conditions, and also capable of holding data representative of a recommended flight direction for emergency conditions. The data structure may in a further embodiment be realised as two separate memory entities, one holding the lowest allowable flight altitude and one holding emergency flight direction information. An advantage with such an arrangement is that the emergency flight direction information can be separately held in a memory and using software of a higher safety level, e.g. according to document RTCA DO-178B.

The foregoing has described the principles, preferred embodiments and modes of operation of the present invention. However, the invention should be regarded as illustrative rather than restrictive, and not as being limited to the particular embodiments discussed above. It should therefore be appreciated that variations may be made in those embodiments by those skilled in the art without departing from the scope of the present invention as defined by the following claims.

The invention claimed is:

1. A method of creating a map of an area of interest indicating the lowest allowable flight altitude to achieve a glide path of a vehicle to a termination point of the area of interest and a map of vectors of the area of interest indicating direction towards a termination point to control an unmanned vehicle, the method comprising:

dividing a map of the area of interest into cells using a grid;
selecting at least one cell defining a termination point;
determining topographical profile, representing general surface features of the ground of each of the cells;
setting the lowest allowable flight altitude to achieve glide path to the termination point for the at least one selected cell defining a termination point to the ground level received from the topographical profile of the termination point and the direction vector to a zero value;
computing the lowest allowable flight altitude for cells adjacent to the cell defining the termination point, wherein the lowest allowable flight altitude is computed to admit gliding of the vehicle to the lowest allowable flight altitude of the cell defining a termination point and in addition define a direction vector of the computed cell pointing towards the cell defining a termination point;
repeating the computing of the lowest allowable flight altitude for cells adjacent to the cell previously computed, wherein the lowest allowable flight altitude is computed to admit gliding of the vehicle to the lowest allowable flight altitude of the previously computed cell and in addition define a direction vector of the computed cell pointing towards the cell defining a termination point; and repeating the setting the lowest allowable flight altitude, computing the lowest allowable flight altitude and repeating computing the lowest allowable flight altitude for all selected termination points until all cells of the divided map has received a lowest allowable flight altitude as well as a direction vector.

2. The method according to claim 1, wherein determining topographical profile of each cell further comprises:

collecting topographical profile from a database including topographical maps.

3. The method according to claim 1, wherein computing lowest allowable flight altitude further comprises:

comparing the computed lowest allowable flight altitude with height data of the topographical profile of each cell and if the computed lowest allowable flight altitude is lower that the height data, the height data is set as the lowest allowable flight altitude with an optional margin and if the computed lowest allowable flight altitude is higher than the height data the computed lowest allowable flight altitude is set as the lowest allowable flight height.

4. A computer program product, comprising:

a non-transitory computer readable medium; and computer program instructions recorded on the computer readable medium and executable by a processor for carrying out a method of creating a supportive geographical data base representing an area of interest useable for controlling an unmanned aeronautical vehicle and indicating, for every geographical position in the data base, a lowest allowable flight altitude and a course to steer to reach a predefined allowable termination point by gliding, the method comprising:

dividing a map of the area of interest into cells using a grid;

selecting at least one cell defining a termination point;

determining topographical profile, representing general surface features of the ground, of each of the cells;

setting the lowest allowable flight altitude to achieve glide path to the termination point for the at least one selected cell defining a termination point to the ground level received from the topographical profile of the termination point and the direction vector to a zero value;

computing the lowest allowable flight altitude for cells adjacent to the cell defining the termination point, wherein the lowest allowable flight altitude is computed to admit gliding of the vehicle to the lowest allowable flight altitude of the cell defining a termination point and in addition define a direction vector of the computed cell pointing towards the cell defining a termination point; and repeating the computing of the lowest allowable flight altitude for cells adjacent to the cell previously computed, wherein the lowest allowable flight altitude is computed to admit gliding of the vehicle to the lowest allowable flight altitude of the previously computed cell and in addition define a direction vector of the computed cell pointing towards the cell defining a termination point until all cells of the divided map has received a lowest allowable flight altitude as well as a direction vector.

5. The computer program product according to claim 4, wherein computing lowest allowable flight altitude further comprises:

comparing the computed lowest allowable flight altitude with height data of the topographical profile of each cell and if the computed lowest allowable flight altitude is lower that the height data, the height data is set as the lowest allowable flight altitude and if the computed lowest allowable flight altitude is higher than the height data the computed lowest allowable flight altitude is set as the lowest allowable flight height.

6. The computer program product according to claim 4, wherein determining topographical profile of each cell further comprises:

collecting topographical profile from a database including topographical maps.

* * * * *